Sept. 18, 1923. 1,468,235
A. P. JAPY
APPARATUS FOR INDICATING QUANTITIES, NUMBERS, AND THE LIKE
Filed Sept. 1, 1921

Inventor:
A. Paul Japy
By Lawrence Langner
Attorney

Patented Sept. 18, 1923.

1,468,235

UNITED STATES PATENT OFFICE.

ALBERT PAUL JAPY, OF BERNE, NEAR SELONCOURT, FRANCE.

APPARATUS FOR INDICATING QUANTITIES, NUMBERS, AND THE LIKE.

Application filed September 1, 1921. Serial No. 497,774.

(GRANTED UNDER THE PROVISIONS OF THE ACT OF MARCH 3, 1921, 41 STAT. L., 1313.)

*To all whom it may concern:*

Be it known that I, ALBERT PAUL JAPY, citizen of the Republic of France, residing at Berne, near Seloncourt, Doubs, France, have invented new and useful Improvements in Apparatus for Indicating Quantities, Numbers, and the like. (for which I have filed application in England, Dec. 23, 1919, Patent No. 151,870, and in France, Dec. 15, 1919, Patent No. 523,031), of which the following is a specification.

This invention has for its object to provide apparatus for expressing the absolute value of a number by the amount by which an indicator is separated from a fixed point taken as the origin, and also for expressing the relative value of this number compared with another chosen number by the amount by which the said indicator is separated from a mark or pointer corresponding to the chosen number.

Such apparatus can be so constructed that the two amounts mentioned above, that is to say the amount which separates the indicator from the origin and the amount which separates the indicator from the mark or pointer can be observed as surfaces, angles, lengths or in any other desired manner.

In fact, the apparatus according to the present invention replaces the reading of figures forming a number, by the physical impression left on the brain by the vision of surfaces, angles or lengths and it also replaces, by means of this same phyiscal impression, the work that the brain has to perform in comparing two numbers expressed in figures.

The apparatus in question allows, by a simple rapid glance at the position occupied by the indicator, the immediate understanding of both values, the absolute and the relative, of the number considered.

By using an apparatus of this kind for each of the particular elements which are of interest in a business (statistics, accountancy, output, for example) and grouping them on a table, a centralization of all the information which may be of use to a director of a business, a manager of a company, a manufacturer, a merchant, can be obtained without the necessity of reading figures and the comparison of numbers expressed in figures.

To enable the invention to be fully understood it will now be described by reference to the accompanying drawings in which one suitable construction according to the invention is illustrated by way of example. In the drawings—

Similar reference numerals and letters denote the same parts in both figures of the drawings.

Figure 1:
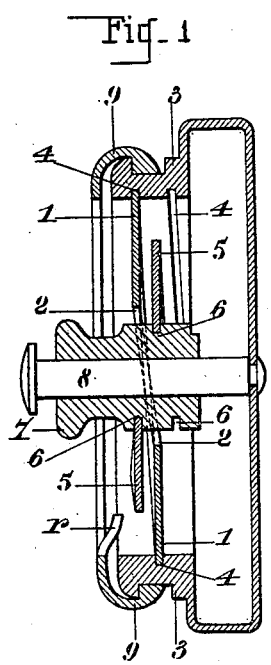
Fig. 1 is a sectional elevation on the line I—I Fig. 2 of an apparatus constructed according to the invention.

The apparatus comprises a disc 1, split at *o* along one of its radii and having a circular opening 2 at its centre. This disc is mounted on a suitable support 3, having a spiral groove 4 in which the outer edge of the said disc is secured, the disc thus being stationary.

Another disc 5 of smaller diameter split at *i* along one of its radii and having a circular opening at its centre is secured by fixing the edge of this opening in a spiral groove 6 formed on the surface of a button 7 rotatably mounted on a pin 8 secured to the support 3.

With this arrangement it will be seen that if the button 7 is turned in the direction of the arrow *a* (Fig. 2) it will carry the disc 5 with it, said disc moving in front of the surface of the disc 1, starting from the radial split in this latter disc. The edge *i* corresponding to the radial split in the disc 5 approaches the edge *o* corresponding to the split in the disc 1; thus the whole of the disc 5 may be turned in front of the disc 1, at which point the two edges *i* and *o* will coincide.

On the other hand, if the button 7 is turned in the direction indicated by the arrow *d* (Fig. 2) the edge *i* moves away from the edge *o* and the surface of the disc 1 covered by the disc 5 decreases until when the edges *i* and *o* coincide the surface is completely uncovered.

Figure 2:
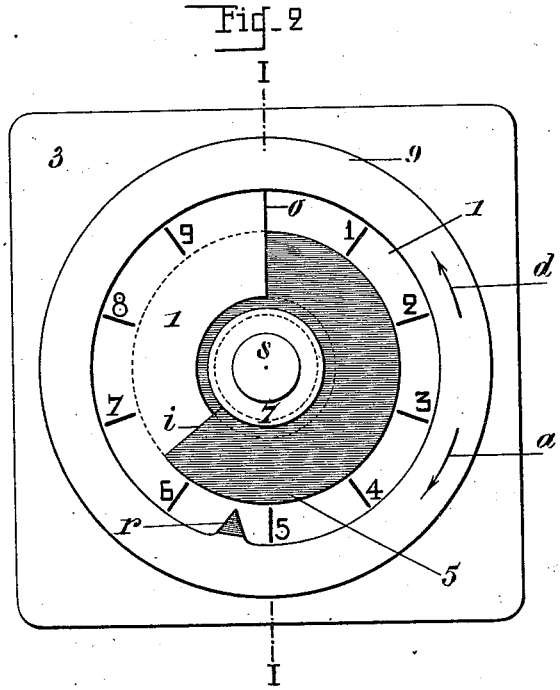
Fig. 2 is a plan view thereof.

The edge *o* forms the origin and the edge *i* the indicator herein before mentioned; the annular sector contained between $o$ and $i$ and shewn section lined in Fig. 2, forms for an observer in front of the apparatus the visible surface, the size of which corresponds to the number considered.

Zero will be expressed by the complete effacement of the disc 5 behind the disc 1.

The disc 5 having a less diameter than the disc 1 a visible annulus will always remain between the outer edges of the two discs, and this annulus may be graduated as shewn in Fig. 2.

In this manner, after having ascertained by the value of the annular surface between the origin $o$ and the indicator $i$, the size of the number corresponding to the position of the said indicator, the exact numerical value of the number may be obtained by reading on the graduated annulus. In the example illustrated this value is equal to 6.4.

The apparatus is also provided with an outer ring or circle 9, rotatably mounted on the support 3 and having a pointer $r$ which can thus be moved round to any number indicated on the afore mentioned graduation or scale on the visible annulus.

This pointer $r$ represents the mark or pointer hereinbefore mentioned and its position corresponds to the normal value of the unit of statistics, accountancy or the like for which the apparatus is set. In the example shewn in Fig. 2 its normal value is 5.4.

It will thus be seen that by simply glancing at the apparatus it can be estimated that the actual value of the unit considered is greater than its normal value and if it is desired to fix exactly upon the value of the corresponding amount on looking at the graduations on the disc 1 it will be seen that this amount is equal to one unit.

It is important to mention that the herein described apparatus is only one example for indicating the manner of carrying out the invention.

It has been clearly specified at the beginning of the description that the two amounts which express respectively the absolute value of a number and relative value of this latter with regard to another number, that is to say the space between the indicator $i$ and the origin $o$ on the one hand, and the space between the indicator $i$ and the pointer $r$ on the other hand can be observed in the form of surfaces, angles, lengths or any other desired form.

The example illustrated in the drawing is a surface observation. In this form the helical discs can be replaced by flat plates.

In this case the disc 1 will have an opening extending over half its surface and the disc 3 will partially close up this opening to an amount proportional to the value of the number to be expressed. One of the circular edges of the opening will be suitably graduated, the pointer $r$ being arranged in front of same.

Figure 3:
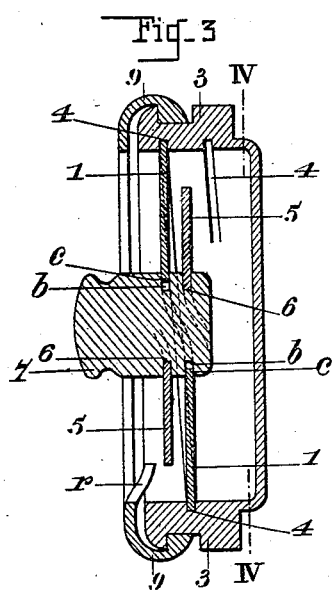
Fig. 3 is a sectional side elevation of a modified form of the invention.

The construction according to Fig. 3 has for its object to dispense with the aforesaid axis 8 of Figs. 1 and 2, by utilizing the fixed dial 1 as a support for the button 7 and also for the movable dial 5.

Referring to Fig. 3 of the drawings it will be seen that to obtain this result, the button 7 is provided with a second spiral groove $b$ in which the fixed disc 1 is engaged by the edge $c$ of its central opening. The disc 1 is always fixed to the support 3 and thus serves as a support for the movable disc 5 through the interposition of the button 7.

It is necessary to remember that the groove 6 which serves to hold the movable disc is not indispensable and the said disc may be fixed to the button 7 by any other suitable means.

Similarly the spiral groove $b$ may be dispensed with by making the cylindrical part of the button 7 of a diameter equal to that of the central opening of the disc 1. In this case the movable disk is supported and guided by the disk which is fixed to the support, the two flattened helices which form the disks sliding the one upon the other.

Figure 4:
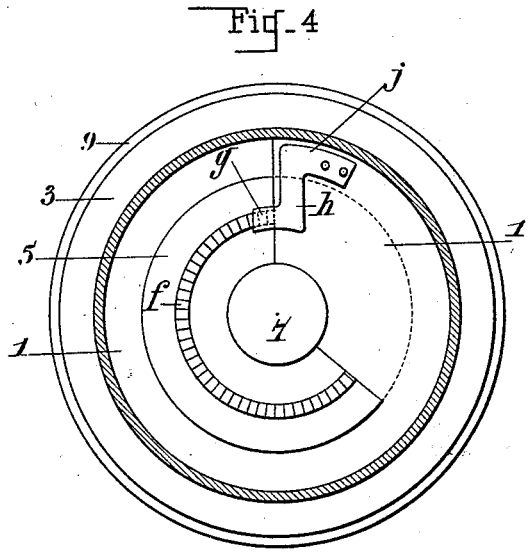
Fig. 4 is an elevation of the back of the apparatus in section on the line IV—IV Fig. 3 shewing the construction of the brake or locking arrangement mentioned previously.

Finally the construction of the warning lock before mentioned is shewn in Fig. 4.

In this figure 1 represents the fixed disc mounted as above described, 3 the support for this disc in the form of a cup the side wall being shewn in section, the said support receiving also the movable ring 9 the back edge of which is clearly shewn on the drawing. 5 represents the movable or visible disc. 7 represents the operating button on which the movable disc 5 is mounted. This button may be supported by a special axis as has been previously described or by the fixed disc 1 itself as has also been described, the disc being then suitably shaped for this purpose.

The warning brake or lock may be very simply constructed as follows:—

The back of the movable disc 5 is provided with a number of notches, teeth or deformations of any kind which may be in the form of a notched plate $f$. This plate cooperates with a tooth or projection $g$, carried on a spring blade $h$ secured at $j$ either to the fixed disc 1, as here shewn, or to a suitable part of the cup 3 which supports the fixed disc.

With this construction it will be seen that the action of the projection $g$ on the notched plate $f$ opposes a slight resistance to the rotation of the movable or visible disc 5, constituting the locking or braking action referred to in the opening portion of this specification. On the other hand the rotation of this disc produces a series of rapid movements of the projection $g$ carried by the spring $h$ which causes the apparatus to resemble a rattle producing the characteristic noise of this well known instrument.

It is necessary to remark that the rapid movements of the spring blade $h$ produced as described may be used to operate an acoustic signal such as a drum for example. Moreover the spring $h$ is not indispensable for producing this "warning brake." It is sufficient in practice to form a projection on the back of the fixed disc 1 by cutting out or embossing, similar to the projection $g$ in such a manner that it contacts with the back of the notches $f$ of disc 5, the back of the disc, owing to the thinness of the metal being notched to the same extent as the front thereof.

Having now particularly described and illustrated the nature of my invention and in what manner the same is to be performed, I declare that what I claim is:—

Apparatus for the purposes described comprising a casing, a fixed disc, a movable disc of less diameter than said fixed disc, and a pointer adapted to be set to any particular point on the circumference of the fixed disc, the two discs each having a radial slit and a circular central opening, the arrangement being such that the movable disc can be moved in front of the fixed disc, the slit on the fixed disc forming an origin, the space between said origin and the slit in the movable disc representing the value of the number, the comparative value thereof being given by the space between the slit on the movable disc and the pointer set to a particular point on the fixed disc, and an operating button for the movable disc, supported by the central opening of the fixed disc, the fixed disc being in turn supported by its outer edge by the casing, the movable disc being mounted on said button by the edge of its central opening in any suitable manner.

In testimony whereof I have signed my hand to this description in presence of two witnesses.

A. PAUL JAPY.

Witnesses:
 JULES FAYOLLET,
 PIERRE LOYER.